United States Patent
Murayama

(10) Patent No.: US 11,492,275 B2
(45) Date of Patent: Nov. 8, 2022

(54) WATER TREATMENT DEVICE AND WATER TREATMENT METHOD

(71) Applicant: KABUSHIKI KAISHA TOSHIBA, Tokyo (JP)

(72) Inventor: Hirotoshi Murayama, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 69 days.

(21) Appl. No.: 17/095,255

(22) Filed: Nov. 11, 2020

(65) Prior Publication Data
US 2021/0147264 A1 May 20, 2021

(30) Foreign Application Priority Data
Nov. 15, 2019 (JP) .............................. JP2019-207039

(51) Int. Cl.
*C02F 1/467* (2006.01)
*C02F 1/44* (2006.01)
*C02F 103/08* (2006.01)

(52) U.S. Cl.
CPC ............ *C02F 1/4676* (2013.01); *C02F 1/441* (2013.01); *C02F 2103/08* (2013.01); *C02F 2201/4612* (2013.01)

(58) Field of Classification Search
USPC .......................... 210/652; 204/252, 632, 628
See application file for complete search history.

(56) References Cited

U.S. PATENT DOCUMENTS

| | | | | |
|---|---|---|---|---|
| 5,858,202 A * | 1/1999 | Nakamura | ............ | C02F 1/4618 204/278.5 |
| 6,001,238 A * | 12/1999 | Takayasu | ............ | C02F 1/4678 205/757 |
| 6,143,163 A * | 11/2000 | Sawamoto | ............ | C02F 1/4618 204/263 |
| 6,475,371 B1 * | 11/2002 | Shirahata | ............ | C02F 1/4618 205/742 |
| 6,623,615 B1 * | 9/2003 | Morisawa | ............ | C02F 1/4618 205/756 |
| 8,196,405 B2 * | 6/2012 | Wolf | ............ | F01K 23/00 60/671 |
| 9,624,117 B2 * | 4/2017 | Yim | ............ | C02F 1/4618 |
| 10,071,920 B2 * | 9/2018 | Hanaoka | ............ | C02F 1/4618 |
| 2002/0017463 A1 * | 2/2002 | Merida-Donis | ............ | H01M 16/006 204/647 |
| 2002/0090868 A1 * | 7/2002 | Schmitman | ............ | C01B 3/001 440/113 |
| 2005/0092618 A1 * | 5/2005 | Venkatesan | ............ | H01M 12/06 204/266 |

(Continued)

FOREIGN PATENT DOCUMENTS

JP 2003-342771 A 12/2003
JP 2004-41888 A 2/2004

(Continued)

*Primary Examiner* — Nina Bhat
(74) *Attorney, Agent, or Firm* — Maier & Maier, PLLC

(57) ABSTRACT

A water treatment device includes: a water electrolyzer configured to produce oxygen gas by electrolyzing water; a pressurization mechanism pressurizing raw water by being supplied with the oxygen gas produced in the water electrolyzer; and a processor to which the raw water pressurized by the pressurization mechanism is supplied, the processor including a reverse osmosis membrane.

8 Claims, 2 Drawing Sheets

(56) References Cited

U.S. PATENT DOCUMENTS

| | | | | |
|---|---|---|---|---|
| 2010/0252445 | A1* | 10/2010 | Highgate | C25B 1/04 |
| | | | | 205/628 |
| 2017/0081220 | A1* | 3/2017 | Taylor | C02F 1/463 |
| 2019/0145012 | A1* | 5/2019 | Murayama | C25B 13/02 |
| | | | | 205/628 |
| 2019/0319285 | A1* | 10/2019 | Milos | C25B 15/08 |
| 2020/0283916 | A1* | 9/2020 | Murayama | C25B 15/08 |
| 2021/0146307 | A1* | 5/2021 | Dehlsen | B01D 61/08 |

FOREIGN PATENT DOCUMENTS

| | | |
|---|---|---|
| JP | 2004-97911 A | 4/2004 |
| JP | 2005-273464 A | 10/2005 |

* cited by examiner

WATER TREATMENT DEVICE AND WATER TREATMENT METHOD

CROSS-REFERENCE TO RELATED APPLICATIONS

This application is based upon and claims the benefit of priority from Japanese Patent Application No. 2019-207039, filed on Nov. 15, 2019; the entire contents of which are incorporated herein by reference.

FIELD

Embodiments relate to a water treatment device and a water treatment method.

BACKGROUND

Conventionally, technology has been developed to use a reverse osmosis membrane (RO membrane) to produce treated water such as fresh water, city water, or the like from raw water such as seawater or the like. A large amount of electrical power is consumed when causing the water content of seawater to pass through a reverse osmosis membrane because it is necessary to pressurize the seawater with a compressor or the like.

DETAILED DESCRIPTION

A water treatment device according to an embodiment includes: a water electrolyzer configured to produce oxygen gas by electrolyzing water; a pressurization mechanism pressurizing raw water by being supplied with the oxygen gas produced in the water electrolyzer; and a processor to which the raw water pressurized by the pressurization mechanism is supplied, the processor including a reverse osmosis membrane.

A water treatment method according to an embodiment includes: producing a gas by electrolyzing an electrolytic solution; pressurizing raw water by using pressure of the gas; and producing treated water by causing the pressurized raw water to pass through a reverse osmosis membrane.

First Embodiment

Figure 1:
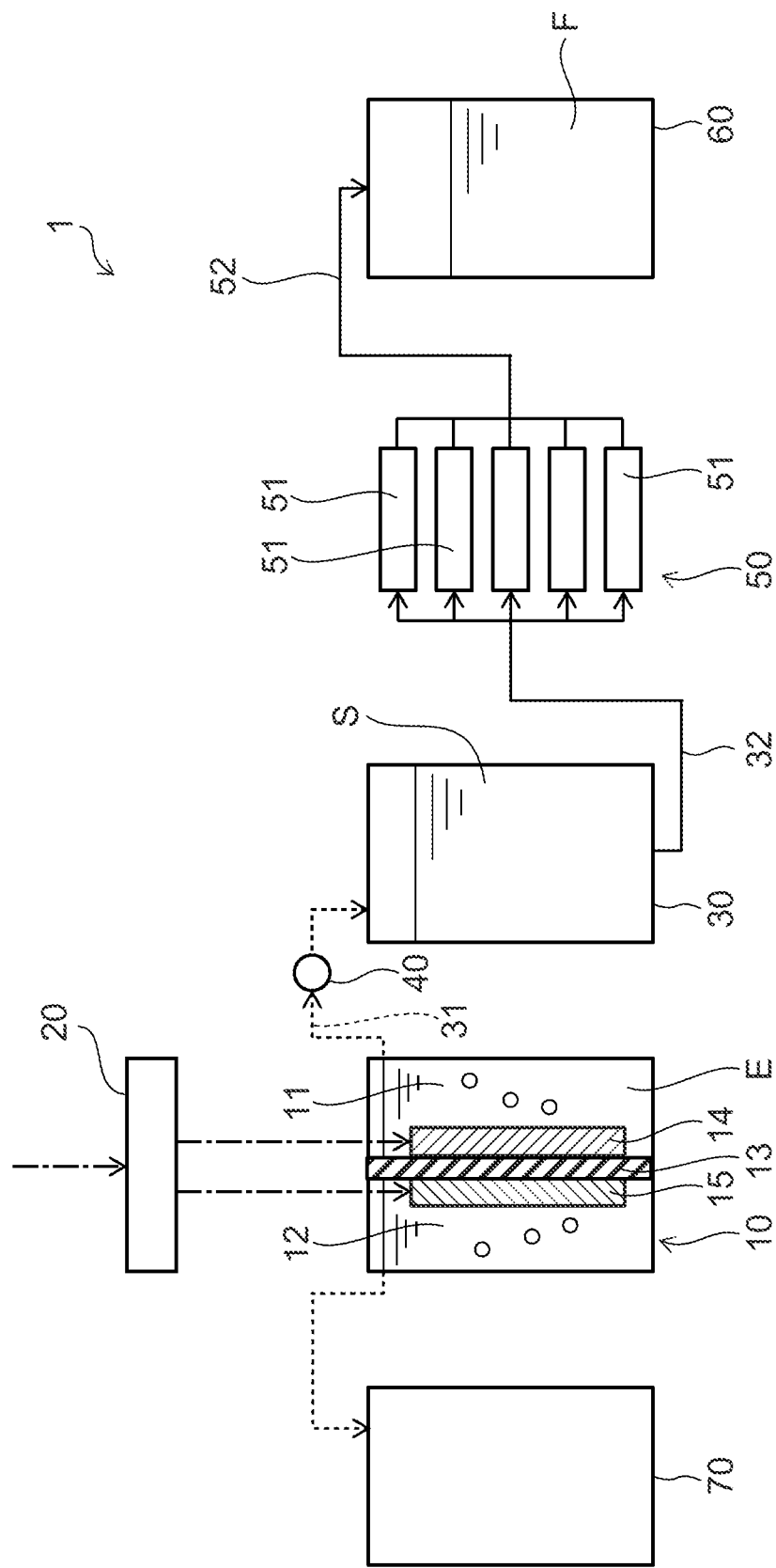
FIG. 1 shows a water treatment device according to a first embodiment.

FIG. 1 shows a water treatment device according to the embodiment.

As shown in FIG. 1, the water treatment device 1 according to the embodiment includes a water electrolyzer 10, a power control device 20, a raw water tank 30 which is a pressurization mechanism, a release device 40, a filter 50 which is a processor, a treated water tank 60, and a hydrogen gas tank 70. In FIG. 1, the flows of liquids are illustrated by solid lines, the flows of gases are illustrated by broken lines, and electric currents are illustrated by single dot-dash lines. This is similar in FIG. 2 described below as well.

The water electrolyzer 10 produces oxygen gas ($O_2$) and hydrogen gas ($H_2$) by electrolyzing water. A positive-side cell 11 and a negative-side cell 12 are provided in the water electrolyzer 10. An electrolytic solution E is stored inside the positive-side cell 11 and inside the negative-side cell 12. The electrolytic solution E is, for example, an alkaline aqueous solution. For example, the positive-side cell 11 and the negative-side cell 12 are partitioned by a porous plate 13. Although the porous plate 13 is a plate-shaped body including a porous membrane, it is sufficient to include a porous membrane, and the porous plate 13 is not limited to a plate-shaped body. An ion exchange film may be provided instead of the porous plate 13. A positive electrode 14 is provided inside the positive-side cell 11, and a negative electrode 15 is provided inside the negative-side cell 12.

The positive electrode 14 and the negative electrode 15 are connected to the power control device 20, and direct current power is supplied from the power control device 20. Electrical power may be supplied to the power control device 20 from an existing power system, or electrical power may be supplied from a power generation device (not illustrated) provided outside the water treatment device 1. The power generation device may utilize renewable energy and may be, for example, a solar power generation device or a wind power generation device.

The raw water tank 30 stores raw water S. The raw water S is water, e.g., seawater, that includes uncontrolled impurities. The raw water S collects at the lower part of the raw water tank 30, and a vapor phase exists at the upper part of the raw water tank 30. The upper part of the positive-side cell 11 of the water electrolyzer 10 and the upper part of the raw water tank 30 (e.g., a predetermined part of the raw water tank 30 such as the upper surface or the like of the raw water tank 30 at which a vapor phase normally exists when operating the water treatment device 1) are connected by an oxygen pipe 31 so that oxygen gas can flow. For example, the positive-side cell 11, the oxygen pipe 31, and the raw water tank 30 are airtightly connected. Thereby, the pressure inside the positive-side cell 11 of the water electrolyzer 10 is applied to the raw water S of the raw water tank 30. On the other hand, the lower part of the raw water tank 30 (e.g., a predetermined part of the raw water tank 30 such as the bottom surface or the like of the raw water tank 30 at which a liquid phase normally exists when operating the water treatment device 1) and the filter 50 are connected by a raw water pipe 32. At least a portion of the liquid surface of the raw water S stored by the raw water tank 30 is a free surface.

Although the raw water tank 30 is used as the pressurization mechanism in the embodiment, it is sufficient for the pressurization mechanism to be configured to pressurize the raw water S by the supply of the oxygen gas produced by the water electrolyzer 10; for example, a cylinder that stores the raw water S, a piston that pressurizes the raw water S inside the cylinder, etc., may be used.

The release device 40 is interposed partway through the oxygen pipe 31. The release device 40 releases the oxygen gas from the oxygen pipe 31 when the pressure of the oxygen gas of the oxygen pipe 31 reaches or exceeds a predetermined value. The release device 40 may be a pressure reducing valve that opens when the pressure inside the oxygen pipe 31 reaches or exceeds the predetermined value. The opening and closing of the release device 40 may be realized by only mechanical means, or may be realized by electrical means. Electrical means may include a pressure sensor that measures the pressure at the part of the oxygen pipe 31 at the positive-side cell 11 side, a motor that operates based on a measured value of the pressure sensor, etc.

The filter 50, which is the processor, includes a reverse osmosis membrane 51 and is configured to receive the supply of the raw water S pressurized by the raw water tank 30, which is the pressurization mechanism.

One or multiple reverse osmosis membranes 51 are provided in the filter 50. When multiple reverse osmosis membranes 51 are provided, the reverse osmosis membranes 51 are connected to each other in parallel. The shape of each reverse osmosis membrane 51 is, for example, cylindrical. The raw water S is supplied to the filter 50 from the raw water tank 30 via the raw water pipe 32. The raw water S that is supplied to the filter 50 is distributed into the reverse osmosis membranes 51, filtered by the reverse osmosis membranes 51, and separated into treated water F and concentrated water (not illustrated). The impurity concentration of the treated water F is less than the impurity concentration of the concentrated water. When the raw water S is seawater, the impurity concentration is, for example, the salinity.

The parts of the reverse osmosis membranes 51 that discharge the treated water F are connected to the treated water tank 60 via a treated water pipe 52. The treated water tank 60 stores the treated water F.

The hydrogen gas that is produced in the negative-side cell 12 of the water electrolyzer 10 flows into the hydrogen gas tank 70. The hydrogen gas tank 70 stores the hydrogen gas.

Other than the components described above, the water treatment device 1 also may include an electrolytic solution supplier that supplies the electrolytic solution E to the water electrolyzer 10, an oxygen gas separator that separates the electrolytic solution E and the oxygen gas, a hydrogen gas separator that separates the electrolytic solution E and the hydrogen gas, an oxygen gas scrubbing tower that removes the electrolytic solution E from the oxygen gas, a hydrogen gas scrubbing tower that removes the electrolytic solution E from the hydrogen gas, etc.

An operation of the water treatment device 1 according to the embodiment, i.e., a water treatment method according to the embodiment, will now be described.

The water treatment method according to the embodiment includes a gas production process, a raw water pressurization process, and a treated water production process. In the gas production process, gases are produced by electrolyzing the electrolytic solution. In the raw water pressurization process, raw water is pressurized by the pressure of a gas produced by the electrolysis of the gas production process. In the treated water production process, treated water is produced by passing the raw water pressurized in the raw water pressurization process through a reverse osmosis membrane.

The raw water S is stored inside the raw water tank 30. A vapor phase exists at the upper part inside the raw water tank 30. The electrolytic solution E is stored inside the water electrolyzer 10. In this state, a direct current voltage is applied between the positive electrode 14 and the negative electrode 15 when electrical power is supplied to the power control device 20 from the outside.

The electrolytic solution E that is inside the water electrolyzer 10 is electrolyzed thereby; oxygen gas is produced inside the positive-side cell 11; and hydrogen gas is produced inside the negative-side cell 12 (the gas production process). At this time, the pressure inside the positive-side cell 11 increases due to the production of the oxygen gas, and the pressure inside the negative-side cell 12 increases due to the production of the hydrogen gas. For example, the pressure of the oxygen gas inside the positive-side cell 11 is about 1 to 2 MPa.

Because the positive-side cell 11 and the raw water tank 30 are airtightly connected by the oxygen pipe 31, the pressure inside the positive-side cell 11 is applied to the raw water S inside the raw water tank 30 (the raw water pressurization process). Thereby, the pressurized raw water S passes through the reverse osmosis membrane 51 and is separated into the treated water F and the concentrated water. The treated water F flows into the treated water tank 60 via the treated water pipe 52 and is stored by the treated water tank 60 (the treated water production process). On the other hand, the hydrogen gas that is produced inside the negative-side cell 12 is stored in the hydrogen gas tank 70.

When the pressure inside the oxygen pipe 31 reaches or exceeds a predetermined value, the release device 40 operates and releases the oxygen gas to the outside. The application of an excessive pressure to the reverse osmosis membrane 51 can be avoided, and the reverse osmosis membrane 51 can be protected thereby.

Thus, the water treatment device 1 can produce the treated water F and hydrogen gas due to the supply of the raw water S and the electrical power from the outside. The treated water F is dispatched from the treated water tank 60 by piping, a transport vehicle, etc., and is used in various applications. The hydrogen gas is dispatched from the hydrogen gas tank 70 by piping, a transport vehicle, etc., and is supplied to a fuel cell, a hydrogen automobile, etc.

Effects of the embodiment will now be described.

In the embodiment, the positive-side cell 11 of the water electrolyzer 10 is connected to the raw water tank 30; therefore, the pressure of the oxygen gas produced in the water electrolyzer 10 can be applied to the raw water S inside the raw water tank 30, and the raw water S can be caused to pass through the reverse osmosis membrane 51. A compressor or the like for pressurizing the raw water S is unnecessary, and the power consumption can be reduced thereby. Also, the cost for providing a compressor or the like can be reduced.

According to the embodiment, oxygen is dissolved inside the raw water S because the oxygen gas contacts the raw water S inside the raw water tank 30. Therefore, the oxygen concentration of the treated water F is high. For example, the treated water F that has a high oxygen concentration is favorable for agricultural applications.

A compressor for pressurizing the raw water S may be provided in the water treatment device 1. Thereby, for example, the raw water S can be efficiently filtered when the filter 50 is large compared to the throughput of the water electrolyzer 10, etc. In such a case as well, the power consumption and the equipment cost can be lower than when the water electrolyzer 10 is not provided.

Multiple stages of filters 50 may be provided between the raw water tank 30 and the treated water tank 60. The treated water F that has a lower impurity concentration can be easily obtained thereby. In such a case, the pressure of the oxygen gas can be added at the inlet side of the filter 50 of each stage. Also, a filter that uses a technique in which the raw water S is not pressurized may be provided between the raw water tank 30 and the filter 50.

Second Embodiment

Figure 2:
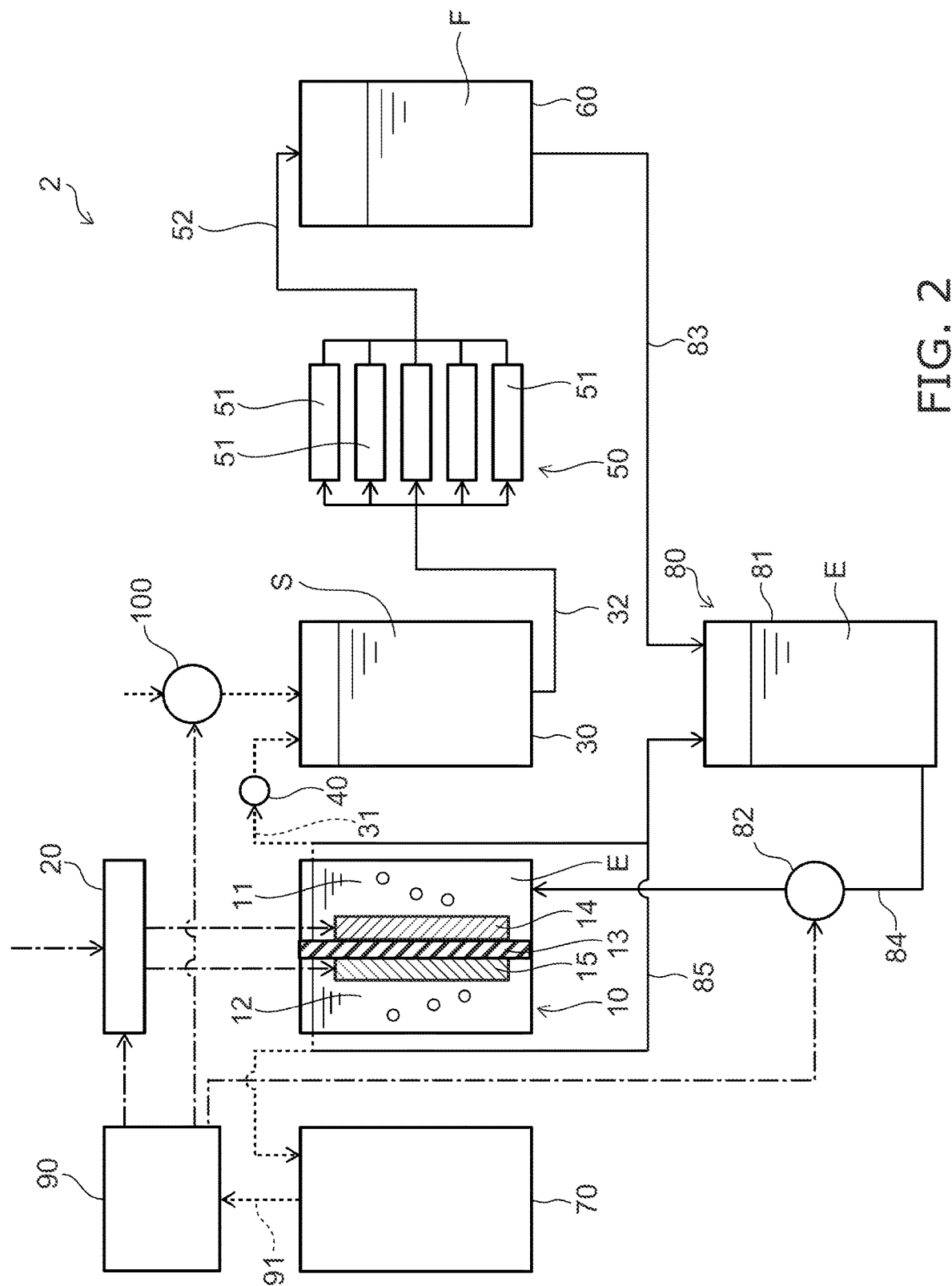
FIG. 2 shows a water treatment device according to a second embodiment.

FIG. 2 shows a water treatment device according to the embodiment.

As shown in FIG. 2, the water treatment device 2 according to the embodiment includes a treated water supplier 80, a generator 90, and a booster 100 in addition to the configuration of the water treatment device 1 according to the first embodiment.

An electrolytic solution tank 81 and a compressor 82 are provided in the treated water supplier 80. The electrolytic solution E is stored inside the electrolytic solution tank 81. The upper part, e.g., the upper surface of the electrolytic solution tank 81 and the lower part, e.g., the lower surface of the treated water tank 60 are connected by a treated water pipe 83. Thereby, the treated water F is supplied from the treated water tank 60 to the electrolytic solution tank 81 via the treated water pipe 83. By adding the treated water F to the electrolytic solution E as the concentration of the electrolytic solution E increases due to the electrolysis, the concentration of the electrolytic solution E can be maintained within a prescribed range.

The water electrolyzer 10 and the lower part of the electrolytic solution tank 81 are connected by an electrolytic solution pipe 84. The compressor 82 is interposed partway through the electrolytic solution pipe 84. The upper part of the positive-side cell 11 and the upper part of the negative-side cell 12 of the water electrolyzer 10 are connected to the upper part of the electrolytic solution tank 81 via an electrolytic solution pipe 85. Thereby, by operating the compressor 82, the electrolytic solution E is supplied from the electrolytic solution tank 81 to the water electrolyzer 10 via the electrolytic solution pipe 84, and the electrolytic solution E returns from the water electrolyzer 10 to the electrolytic solution tank 81 via the electrolytic solution pipe 85.

Thus, as an entirety, the electrolytic solution E circulates between the water electrolyzer 10 and the electrolytic solution tank 81. The concentration of the electrolytic solution E is maintained within the prescribed range by the treated water supplier 80 supplying the treated water F to the water electrolyzer 10 via the electrolytic solution tank 81.

The generator 90 includes, for example, a fuel cell. The generator 90 is connected to the hydrogen gas tank 70 via a hydrogen pipe 91. Thereby, the hydrogen gas that is stored inside the hydrogen gas tank 70 is supplied to the generator 90. The generator 90 generates power by utilizing the hydrogen gas and the oxygen in ambient air. Then, for example, the power control device 20, the compressor 82, and the booster 100 are driven by supplying the generated electrical power.

The booster 100 is, for example, a pump. Ambient air can flow into the inlet side of the booster 100, and the outlet side of the booster 100 is connected to the upper part, e.g., the upper surface of the raw water tank 30. By operating the booster 100, ambient air is pressurized and supplied to the raw water tank 30. The raw water S that is inside the raw water tank 30 can be pressurized thereby. The booster 100 is operated by the electrical power supplied from the generator 90, and the generator 90 generates power due to the hydrogen gas produced in the water electrolyzer 10; therefore, at least a portion of the electrical power for operating the booster 100 can be provided within the water treatment device 2.

Effects of the embodiment will now be described.

In the embodiment, the generator 90 that generates electrical power by using the hydrogen gas produced in the water electrolyzer 10 is provided. Hydrogen gas and oxygen gas can be produced by driving the water electrolyzer 10 with the electrical power generated by the generator 90; the electrolytic solution E can be circulated and the treated water F can be added to the electrolytic solution E by driving the compressor 82; and more pressure can be added to the raw water S inside the raw water tank 30 by driving the booster 100. Thus, according to the embodiment, the hydrogen gas that is produced in the water electrolyzer 10 can be effectively utilized, and the processing efficiency of the raw water S can be increased. Otherwise, the configuration, the operations, and the effects of the embodiment are similar to those of the first embodiment.

In the embodiment, one or two of the treated water supplier 80, the generator 90, or the booster 100 may be omitted. Also, both the oxygen gas and the hydrogen gas that are produced by the water electrolyzer 10 may be used to pressurize the raw water S. The efficiency of the processing such as desalination or the like in which treated water is produced from the raw water S can be further increased thereby.

In the first or second embodiment, means such as, for example, a piston or the like may be provided to convert the pressure of the oxygen gas into a mechanical motion, and the raw water S may be pressurized by such means. The oxygen gas no longer contacts the raw water S, and the pressure loss due to the oxygen dissolving in the raw water S can be suppressed thereby.

Because the treated water F can be produced with a low oxygen concentration, for example, the purity of the hydrogen gas produced by the water electrolyzer 10 when the treated water F is supplied to the water electrolyzer 10 and added to the electrolytic solution E can be increased.

According to the embodiments described above, a water treatment device and a water treatment method can be realized in which the power consumption can be reduced.

Although technology that produces treated water such as fresh water or the like from raw water such as seawater or the like is described in the first and second embodiments described above, the raw water is not limited to seawater. For example, purified water or ultra pure water can be produced as the treated water when tap water is used as the raw water.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A water treatment device, comprising:
    a water electrolyzer configured to electrolyze an electrolytic solution, the water electrolyzer comprising an oxygen outlet supplying oxygen gas produced therein;
    pressurizer coupled with the oxygen outlet, the pressurizer being configured to pressurize water by utilizing a pressure of the oxygen gas and comprising a pressurized water outlet supplying pressurized water; and
    filter coupled with the pressurized water outlet comprising a reverse osmosis membrane and a treated water outlet, the filter being configured to supply treated water that passed through the reverse osmosis membrane from the treated water outlet.

2. The water treatment device according to claim 1, wherein
    the pressurizer includes a tank.

3. The water treatment device according to claim 1, wherein
    the treated at outlet is coupled with the water electrolyzer.

4. The water treatment device according to claim 1, wherein
    the electrolyzer further comprises a hydrogen outlet supplying hydrogen gas produced therein the water treatment device further comprising:
a generator configured to generate electrical power the generator utilizing the hydrogen gas supplied from the hydrogen outlet.

5. The water treatment device according to claim 4, further comprising:
a booster pressurizing the raw water, the booster being driven by the electrical power.

6. The water treatment device according to claim 4, wherein
the electrical power is configured to be supplied to the water electrolyzer.

7. The water treatment device according to claim 1, further comprising:
a pressure release coupled with the oxygen outlet,
the release being configured to release the oxygen gas therefrom at a predetermined pressure.

8. A water treatment method, comprising:
producing a gas by electrolyzing an electrolytic solution;
pressurizing raw water by utilizing a pressure of the gas and obtaining pressurized water; and
passing the pressurized water through a filter comprising a reverse osmosis membrane and obtaining treated water.

* * * * *